United States Patent Office 2,805,295
Patented Sept. 3, 1957

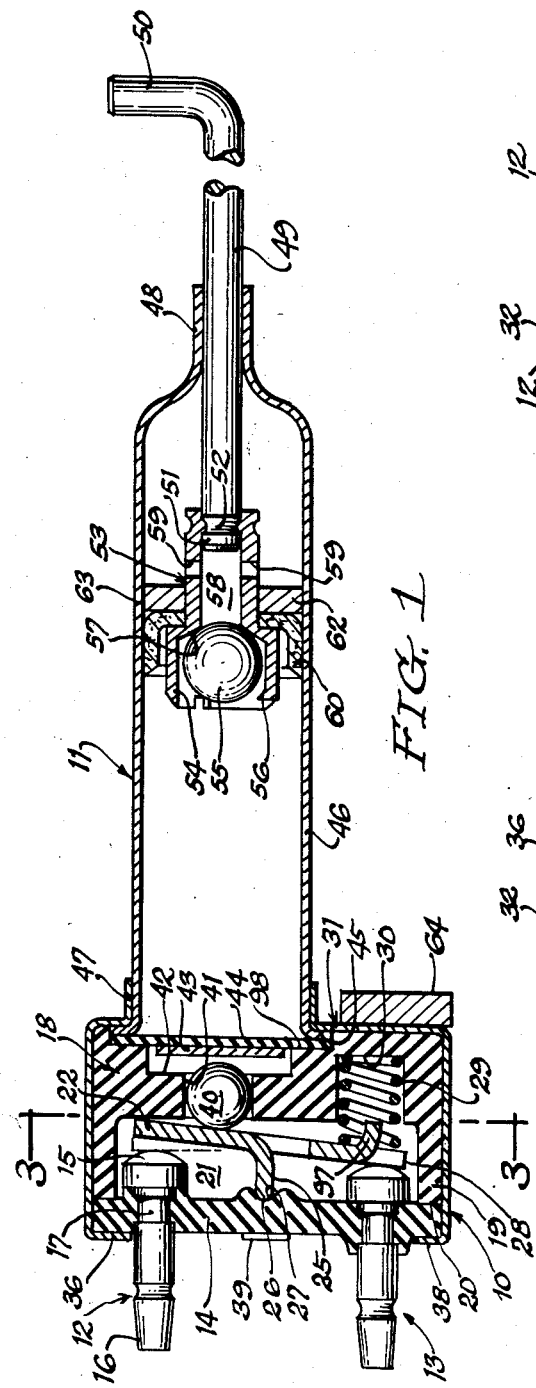
INVENTOR.
Oscar H. Banker

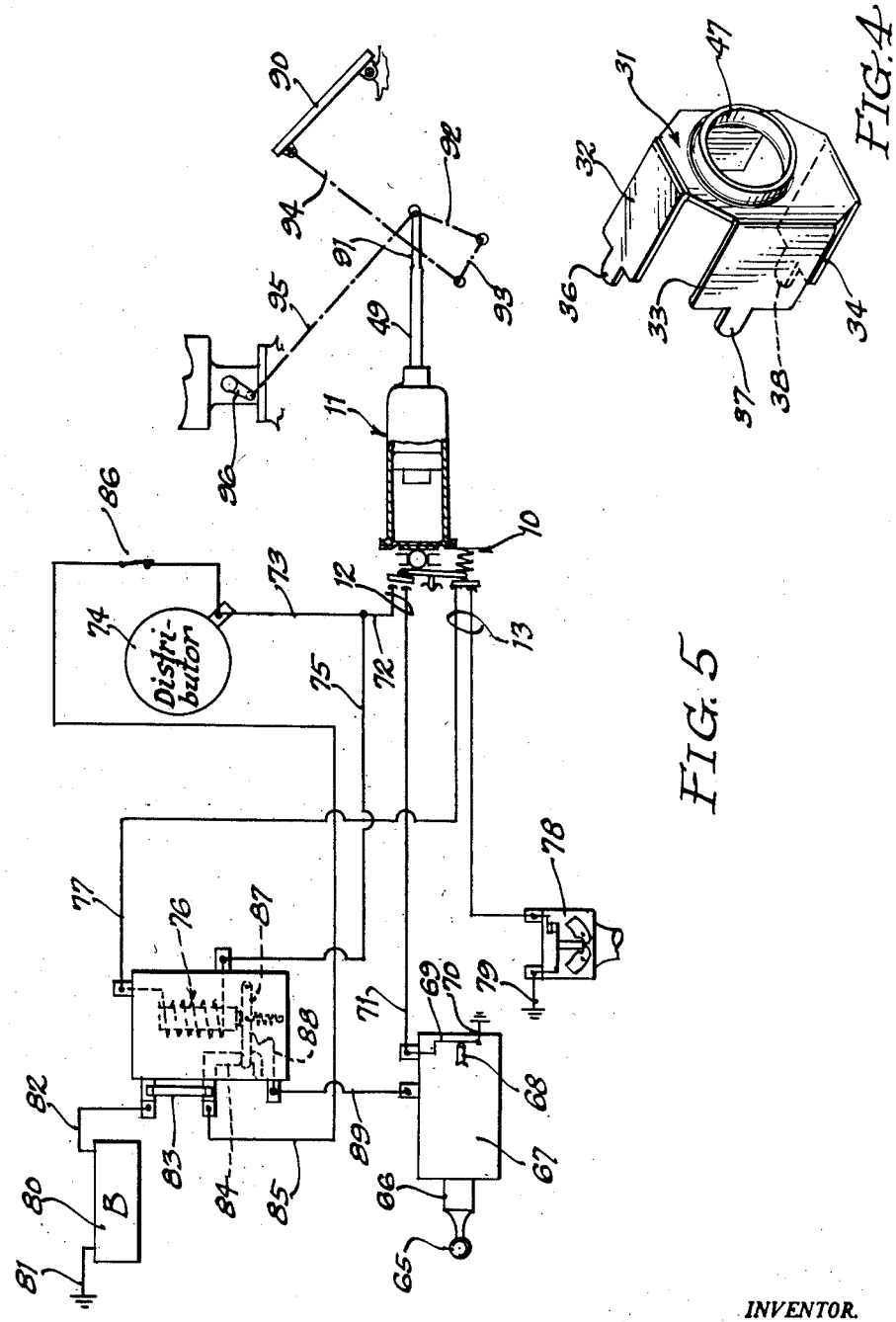

2,805,295

IMPULSE ACTUATED SWITCH

Oscar H. Banker, Evanston, Ill.

Application June 1, 1955, Serial No. 512,402

10 Claims. (Cl. 200—61.45)

This invention relates to an electrical switch for controlling a mechanism, with means interposed between the switch and mechanism for operating the switch upon an abnormally fast movement of the mechanism or its control. For purposes of illustration this invention will be described with reference to its application to the control mechanism for an automobile engine equipped with an automtic transmission such as an overdrive. It is understood, however, that the invention is not limited to such application.

As presently constituted and in popular use, two-speed semi-automatic transmissions known as overdrives are of the planetary gear type and incorporate a sun gear, with positive means for arresting the rotation of the sun gear to effect the overdrive ratio. The positive means is in the form of a radially slidable pawl adapted to enter a slot in a toothed wheel connected to the sun gear. As is characteristic of all positively engageable shift mechanisms, the pawl is not readily disengageable from the toothed wheel under torque to shift back to a lower speed ratio. It frequently happens, however, that it becomes necessary to shift out of the overdrive into a lower speed ratio which means that it becomes necessary to pull the pawl out of its slot when it is conditioned by its automatic control to remain in its slot. Such conditions may arise when the driver while cruising in overdrive suddenly decides to pass another vehicle and finds that he does not have sufficient acceleration in overdrive to take care of the situation. At such times it is psychologically undesirable to have the driver perform any manipulations of the controls requiring him to release his foot from the accelerator of the vehicle and hence, in the overdrive transmissions as presently constituted, means are provided for interrupting the ignition momentarily to relieve the pawl of torque while at the same time conditioning the pawl for withdrawl from its slot. The ignition interrupting means comprises a switch contacted by a lever or arm associated with the accelerator pedal upon movement of the pedal to, or beyond, wide open throttle position. This movement of the pedal is thought to be a normal one under the circumstances and hence unobjectionable.

It has been found, however, that many vehicle drivers would like to shift out of overdrive into a lower speed ratio at times other than an emergency requiring a wide open throttle for acceleration. It has also been found that the interruption of the ignition during wide open throttle condition of the engine promotes a maximum discharge of raw fuel into the exhaust which is both wasted and dangerous, the unburned fuel being susceptible of exploding upon the resumption of the normal operation of the engine.

It is an object of this invention to provide a simple, inexpensive and self-contained device for selectively operating a switch associated with a reciprocable element at any position of the element between the limits of reciprocation thereof upon the occurrence of an abnormal movement of the element.

A more specific object of this invention is the provision of a switch and a control mechanism therefor, said mechanism normally being ineffective to operate the switch, but upon being subjected to a quick movement in a given direction, establishing a force which is sufficient to operate the switch.

Yet another specific object of this invention is the provision of a switch and a control mechanism therefor, said mechanism comprising an air cylinder having a pressure differential sensitive element therein adapted to contact the control for the switch, said pressure differential sensitive mechanism being responsive to a sudden buildup of pressure in the cylinder resulting from the closure of inertia type check valve.

Yet another specific object of this invention is the provision of a switch and an air-operated control therefor wherein both are constructed of stamped and screw machine parts, and of parts that are readily molded from synthetic resins, to reduce the cost of the switch and its control to a minimum. A feature of this invention is a construction of a switch and control therefor which requires no screws, rivets or bolts or other threaded fasteners for its assembly.

These and other objects and features of this invention will become apparent from the following detailed description when taken together with the accompanying drawings in which, Fig. 1 is a cross section through a switch and operating mechanism therefor made in accordance with this invention, the view being greatly enlarged, certain parts thereof being displaced from the normal projection for clarity;

Fig. 2 is an end elevation of the switch of Fig. 1 looking to the right in that figure;

Fig. 3 is an end elevation in section of the switch of Fig. 1 taken along the line 3—3 in that figure and in the direction of the arrows at the ends thereof;

Fig. 4 is a perspective view of a part of the housing for the switch before assembly; and Fig. 5 is a schematic wiring diagram of a typical installation of a switch and control of the type shown in Fig. 1.

Referring now to the drawings for a detailed description of an illustrative embodiment of this invention, and particularly to Fig. 1, the switch is shown generally at 10 on the left-hand side of that figure, and its operator is shown generally at 11 extending to the right of the switch. The switch is comprised of two pairs of contacts 12 and 13, in the form of brass prongs preferably molded into a rectangular plate 14 made of a synthetic electrically insulating resin such as Bakelite or the like. Each prong has a rounded head 15 at one end, a taper 16 at its other end, and a relatively short section 17 of reduced diameter, the latter being of lesser axial extent than the thickness of plate 14 to provide a mechanical interlock between the prong and plate after the plate is molded around the prong.

A substantially rectangular block 18, preferably of the same electrically insulating material as the material of plate 14, is disposed adjacent said plate 14, block 18 being formed with a peripheral flange 19 the free edge 20 of which has the same shape as and abuts on plate 14. It may be apparent that block 18 and peripheral flange 19 form with plate 14 a chamber 21, and that the heads 15 of the prongs extend well into chamber 21.

An electrical connection between the contacts of each pair 12 and 13 is established by a floating brass plate 22 disposed in chamber 21, said plate having, in general, a rectangular outline corresponding to the cross-sectional configuration of chamber 21. The sides 23, 24 of plate 22, as shown in Fig. 3, fit the sides of flange 19 adjacent thereto fairly closely, but with enough play to permit a rocking movement of the plate in chamber 21. The rectangular configuration of plate 22 thus serves to prevent the plate from turning about an axis perpendicular to the plane of the plate with its sides out of parallelism with flange 19.

Plate 22 has a semi-circular tongue 25 struck from the central regions thereof, the tip 26 of tongue 25 being substantially in a plane at right angles to the plane of plate 22. The tip 26 rides in a dimple 27 molded on the inner surface of plate 14 and constitutes a fulcrum about which the plate may tilt. A tongue 97 is struck from the lower edge region 28 of plate 22 in a direction opposite that of tongue 25 and extends into a coil spring 29 disposed in a recess 30 formed in block 18. Spring 29 is normally in compression and therefore urges plate 22 to rotate in a clockwise direction about its fulcrum 26 into engagement with the lower pair of contacts 13. This establishes an electrical connection between the pair of contacts which is intended in the illustrative example herein to be normally made.

Block 18 and plate 14 are held together by a single stamping 31 (Fig. 4) comprising a plate of sheet metal generally overlying the outer surface of block 18 and having broad tabs 32, 33, 34 and 35 bent at right angles to the plane of the plate and embracing the sides of block 18 and plate 14. Each broad tab terminates in a relatively small and narrow tab 36, 37, 38 and 39, respectively, which is bent over the back of plate 14 to hold said plate tightly against peripheral flange 19 on block 18.

The means for tilting plate 22 against the action of spring 29 to break the circuit across contacts 13 and to make the circuit across contacts 12 comprises, in its preferred form, a steel ball 40 movable in a circular opening 41 preferably molded in block 18 and disposed relative to plate 22 substantially as shown in dotted outline in Fig. 3. In such position, ball 40 is disposed substantially equidistantly from sides 23, 24 and on the side of fulcrum 26 adjacent contacts 12, so that should ball 40 be moved to the left as viewed in Fig. 1, it will urge plate 22 to rotate in a counterclockwise direction about its fulcrum 26 and thereby break the circuit across contacts 13 and make a circuit across contacts 12 substantially as shown in dotted outline in Fig. 1.

Adjacent opening 41 and on the right-hand side of block 18 as viewed in Fig. 1 is a recess 42 formed in the bottom of a wider but shallower recess 98. The thickness of block 18 between chamber 21 and recess 42 is less than the diameter of ball 40 so that the ball normally protrudes into chamber 21 as well as into recess 42. Also extending into recess 42 is a circular metallic plate 43 cemented or otherwise adhered to a diaphragm 44 disposed in recess 98. Diaphragm 44 may be made of any suitable resilient deformable material, but preferably is made from a synthetic rubber such as neoprene so that it will be impervious to grease, oil or other substances usually encountered in or about a machine or automotive vehicle and which have a deleterious effect upon natural rubber. The peripheral regions of diaphragm 44 contacting the bottom of recess 98 are clamped thereagainst by a flange 45 formed as the outwardly flared end of a cylinder 46. Plate 31 has a cylindrical flange 47 which embraces cylinder 11 and serves to locate the cylinder accurately with respect to plate 31. Said plate 31 and also flange 45 and with tabs 36, 37, 38 and 39 serves to clamp flange 45, the peripheral regions of the diaphragm 44, block 18 and plate 14 firmly together. It is contemplated that when initially assembled, there will be a slight clearance between plate 31 and the adjacent surface of block 18, but that contact will be established between flange 45, diaphragm 44 and plate 31, so that as the tabs 36, 37, 38 and 39 are bent over, the resilience of the diaphragm material is utilized not only to provide the clamping action required for holding the parts together, but also to establish a fluid-tight seal between flange 45 of cylinder 11 and diaphragm 44.

Cylinder 46 is reduced at its right-hand end as viewed in Fig. 1 to form a relatively short tube 48 which functions as a guide for a rod 49 axially reciprocable with respect to cylinder 46. The outer end 50 of rod 49 may be bent at a right angle to the axis of the rod to provide a convenient means for connecting the rod to external linkage connected to the mechanism to be controlled by the switch 10. The inner end 51 of rod 49 extends into a tubular valve body 53 and has a peripheral groove 52 formed therein into which is deformed the right-hand region as viewed in Fig. 1 of valve body 53. Said valve body is enlarged at its left-hand end as viewed in Fig. 1 to form a socket 54 within which is received a steel ball valve 55. The ball valve is retained in the socket by a plurality of upset regions, or stakes, 56 disposed symmetrically about socket 54. The bottom 57 of socket 54 is tapered to form a seat for ball valve 55 and thereby to close off the inner passage 58 formed by the tubular configuration of valve body 53 when the ball valve is seated therein. The location of the stakes 56 axially of seat 57 is such as to permit ball valve 55 to move axially a limited distance freely in its socket 54 so that it can assume a position wherein free communication is established between passageway 58 and the interior of cylinder 46 to the left of the ball valve as viewed in Fig. 1 and another position wherein such communication is cut off, that is, the position wherein ball valve 55 firmly contacts its seat 57. When ball valve 55 is off its seat 57, communication to the opposite side of the valve body is established through cross bores 59 formed in valve body 53 between the inner end 51 of rod 49 and seat 57.

A piston action is provided around ball 55 in cylinder 46 by a leather cup 60 having its peripheral sides in engagement with the interior of tube 46 and its apertured bottom region surrounding valve body 53 and abutting the exterior surface of socket 54. A disc 61 having a central opening 62 fitting tightly around valve body 53 and an exterior surface 63 having a running sliding fit with the interior of cylinder 46 serves as a back-up plate for leather cup 60 as well as a centering or locating means for valve body 53 to prevent binding of rod 49 in its tube 48.

A bar 64 is spot welded or otherwise secured to plate 31 and is of such dimensions as to extend to either side of the switch 10. Suitable openings 65 are formed in the extending ends by which the switch and its operator may be secured to a frame associated with the device to be controlled by the switch.

It may be apparent from the description thus far given that reciprocation of rod 49 into and out of cylinder 46 at relatively slow speeds is substantially unhindered, air from one side of the cup 60 passing through passage 58 in valve body 53 to the other as it is displaced from the side toward which the cup is moving. Upon a quick movement of rod 49 to the left as viewed in Fig. 1, ball valve 55 will be thrown against its seat 57, partly by inertia forces and partly by the sudden differential pressure created upon the valve by the rush of air past seat 57 into passage 58. The seating of ball valve 55 upon its seat 57 closes passage 58 and thereby traps air between diaphragm 44 and cup 60, valve body 53 and ball valve 55. This trapped air, upon further movement of rod 49 to the left, distends diaphragm 44 similarly to the left, causing circular metal plate 43 to contact ball 40 and thereafter urge said ball to the left. The movement of ball 40 to the left results in a tilting of plate 22 about its fulcrum 26 against spring 29, and this, in turn, causes the circuit to be broken across contacts 13 and to be established across contacts 12. This condition will obtain as long as sufficient pressure is maintained upon rod 49 in a leftward direction as shown in Fig. 1. There will be some leakage of air past ball valve 55 so that the movement of rod 49 is not completely inhibited by the entrapped air.

Upon a reversal of the movement of rod 49 after a rocking of plate 22, ball valve 55 will immediately be unseated and a free flow of air will be established through cross bores 59, passage 58 and past seat 57 into the lefthand side of the cylinder 46 as viewed in Fig. 1. Thus, the movement of rod 49 to the right as viewed in Fig. 1 is always unhindered and results in a restoration of atmospheric pressure in cylinder 46. This in turn permits diaphragm 44 to be restored to its normal position, thereby removing pressure from ball 40 and plate 22. The latter may then return to the position shown in Fig. 1 under the action of spring 29, causing the circuit previously established across contacts 12 to be broken and the circuit across contacts 13 to be reestablished.

The speed of the impulse required to effect a closing of ball valve 55 on its seat is a function of the initial distance between the ball and its seat. The smaller this distance is, the slower the impulse required to seat ball 55. The location of stakes 56 therefore axially of seat 57 may vary to suit the needs of a particular installation.

A typical installation of the switch and operator of Fig. 1 is shown in Fig. 5. The electrical devices there shown with the exception of switch 10 are standard and well known and hence are shown merely in outline in Fig. 5. In this installation, suitable controls are used for effecting a shift of a toothed element of a semi-automatic transmission, such as an overdrive now commonly in use, the controls including a shift element 65 connected at one end to the shiftable toothed element (not shown) and secured at its other end to the armature 66 of a solenoid 67. The end of armature 66 opposite shift element 65 is provided with a pin 68 which moves with armature 66 and is adapted to open a switch 69 mounted on solenoid 67. One side of switch 69 is connected to ground 70 and the other side 71 is connected to one of the contacts of the pair of contacts 12 of switch 10 of Fig. 1. The other contact of the pair 12 is connected to a lead 72 having two branches, one 73 being connected to the distributor 74 of the engine associated with the transmission and the other branch 75 being connected to one side of a relay 76. The other side 77 of relay 76 is connected to one of the contacts of the pair of contacts 13, the other contact of the pair 13 being connected to a governor switch 78 driven by some member of the transmission moving in timed relation with the movement of the vehicle. The other side of governor switch 78 is connected to ground 79.

Energy for operating solenoid 67 and relay 76 is supplied by a battery 80 connected on one side 81 to ground and on the other side 82 through a fuse 83 to a contact 84 in relay 76, and through a branch lead 85 through the ignition switch 86 and thence to distributor 74. Relay arm 87, which is adapted to make contact with the contact 84 of the relay, is connected by a lead 88 and an external lead 89 to one side of solenoid 67, the other side of solenoid 67 being connected to lead 71.

Switch 10 and its operator 11 are adapted to be operated as a function of the movement of the accelerator pedal 90 of the vehicle in which the transmission controlled by shift element 65 is installed. Thus rod 49 is connected through suitable linkage 91, 92, 93 and 94 to accelerator pedal 90. Link 91 may also be connected at its free end with a link 95 and the latter in turn may be connected to a throttle lever 96 by which the fuel intake to the vehicle engine may be regulated.

Under normal operating conditions, accelerator pedal 90 may move freely to regulate the power of the vehicle engine, its movement being transmitted to throttle lever 96 and, through link 91, to rod 49. Upon the attainment of a vehicle speed at which governor switch 78 is set to close, the circuit through the governor is completed, as is also the circuit through relay 76 and battery 80 through contacts 13, thereby energizing relay 76 and solenoid 67 through switch 69 and ground 70. It is understood that certain other mechanisms are included in solenoid 67 such as a holding coil and an additional switch, the details of which are not material to a description of this invention and hence they will not be described herein in detail. As is characteristic of positively interengageable shift elements, the shift into the overdrive, or other higher ratio produced by the transmission associated with the control, is made upon slowing down the engine until synchronization and the shift take place, whereupon the drive through the engine may be resumed. The slowing down of the engine is accomplished by releasing accelerator pedal 90. While in overdrive it may become necessary to shift out of overdrive to the next lower ratio to provide sufficient acceleration to take care of an emergency such as the passing of a vehicle on the road. This down shift is accomplished with the aid of switch 10 and its operator 11 merely by giving accelerator pedal 90 a quick movement or tap in a throttle opening direction. This quick movement of the accelerator pedal is transmitted through links 94, 93, 92 and 91 to rod 49 and results in the seating of ball valve 55 on its seat 57 to trap the air between the ball valve and diaphragm 44 as previously described. Continued pressure on accelerator pedal 90 results in the maintenance of pressure in cylinder 46 which in turn holds diaphragm 44 to the left as viewed in Fig. 1, and effects a tilting of the plate 22 to break contacts 13 and to establish a circuit through contacts 12.

As seen in Fig. 5, breaking the circuit through contacts 13 has the effect of disconnecting relay 76 from ground and thereby deenergizing said relay. This in turn causes the circuit through solenoid 67 to be broken, thereby establishing a pull (through a spring not shown) on shift element 65 to effect the desired downshift. Meanwhile, the establishment of a circuit across contacts 12 grounds the distributor 74 and temporarily effects a cessation of the operation of the engine. This cessation of operation relieves the torque on the shiftable element of the transmission whereupon the element can be shifted by armature 66 to its downshifted position. Upon the movement of armature 66 to the right in response to the shifting movement of the shiftable element, pin 68 will contact switch 69 and open said switch, thereby removing ground from the ignition and restoring the operation of the engine.

It may be apparent that the downshift effected by switch 10 in its operator 11 can take place at any speed of the vehicle above the cut-in speed for the governor switch 78 and at any position of accelerator pedal 90 in the entire range of movement of the latter. This operation gives the driver a greater freedom of choice of accelerator positions at which a shift can be made and does not require that the throttle be wide open at the time the ignition is interrupted as in the controls heretofore used.

It may be observed further that the switch operator 11, since it uses air, is a self-contained unit and requires no connection to a source of fluid as in prior designs. The construction of all of the parts of the operator 11 as well as of switch 10 is such as to use only the simplest and most commonly found manufacturing processes and procedures. The assembly of the unit is accomplished without the use of threaded fasteners of any kind. This eliminates, or at least reduces, the number of expensive drilled or tapped openings required.

It is understood that the foregoing description is merely illustrative of a preferred embodiment of the invention and that the scope of the invention is not to be limited thereto but is to be determined by the appended claims.

I claim:

1. In combination, a switch and an operator therefor, said switch including a pair of contacts, means for establishing an electrical connection between said contacts, and resilient means biasing the connection establishing means to dis-establish such connection; and said operator comprising a cylinder, a piston in the cylinder, a flexible diaphragm defining a part of the cylinder, a valve body in communication with fluid in the portion of the cylinder between the piston and diaphragm and having a passageway therethrough from said portion to a portion of the cylinder outside thereof, and a pressure responsive valve adjacent said passageway and adapted to close said passageway solely upon a sudden increase in pressure of the fluid in the first-mentioned portion of said cylinder created by an abnormally quick movement of the piston toward said diaphragm, the closing of the passageway upon further movement of the piston resulting in a further increase in pressure in the first-mentioned portion and in a deflection of the diaphragm, and means for transmitting the deflection of the diaphragm to the connection-establishing means of the switch to establish such connection between said switch contacts.

2. In combination a switch and an operator therefor, said switch comprising a plate having a pair of contacts thereon, a block having a recess in one side thereof, said plate being adapted to cover the recess to form a chamber, pivoted means in the chamber for establishing a connection between said contacts, resilient means normally holding the pivoted means in contact dis-establishing condition, said block having a recess on the side thereof opposite the side having the first-mentioned recess, a diaphragm covering the second recess, means between the diaphragm and pivoted means for transmitting motion from the diaphragm to the pivoted means, a cylinder adjacent the block and defined in part by the diaphragm, a piston, and means between the piston and diaphragm for establishing a diaphragm-moving pressure in the cylinder solely upon an abnormally fast movement of the piston toward said diaphragm.

3. In combination, a switch and an operator therefor, said switch including a pair of contacts, means for establishing an electrical connection between said contacts, and resilient means biasing the connection establishing means to dis-establish such connection; and said operator comprising a cylinder, a piston in the cylinder, a flexible diaphragm defining a part of the cylinder, a valve body in communication with fluid in the portion of the cylinder between the piston and diaphragm and having a passageway therethrough from said portion to a portion of the cylinder outside thereof, and a pressure responsive valve adjacent said passageway and adapted to close said passageway upon a sudden increase in pressure of the fluid in the first-mentioned portion of said cylinder created by an abnormally quick movement of the piston toward said diaphragm, the closing of the passageway upon further movement of the piston resulting in a further increase in pressure in the first-mentioned portion and in a deflection of the diaphragm, means for transmitting the deflection of the diaphragm to the connection-establishing means of the switch to establish such connection between said switch contacts, and a piston rod extending into the cylinder and into the passageway in the valve body, said piston rod having a peripheral groove and said valve body being deformed into said groove to form a mechanical lock between the piston rod and valve body.

4. In combination, a switch and an operator therefor, said switch including a pair of contacts, means for establishing an electrical connection between said contacts, and resilient means biasing the connection establishing means to disestablish such connection; and said operator comprising a cylinder, a piston in the cylinder, a flexible diaphragm defining a part of the cylinder, a valve body in communication with fluid in the portion of the cylinder between the piston and diaphragm and having a passageway therethrough from said portion to a portion of the cylinder outside thereof, and a pressure responsive valve adjacent said passageway and adapted to close said passageway upon a sudden increase in pressure of the fluid in the first-mentioned portion of said cylinder created by an abnormally quick movement of the piston toward said diaphragm, the closing of the passageway upon further movement of the piston resulting in a further increase in pressure in the first-mentioned portion and in a deflection of the diaphragm, and means for transmitting the deflection of the diaphragm to the connection-establishing means of the switch to establish such connection between said switch contacts, said piston comprising an apertured plate, said valve body comprising a tubular portion passing through the aperture in the plate and secured to said plate and an enlarged portion adjacent the tubular portion, a flexible deformable cup-shaped packing compressed between the enlarged portion of the valve body and the apertured plate, and said valve comprising a ball disposed loosely in the enlarged portion of the valve body adjacent the tubular portion and adapted to close off the tubular portion.

5. In combination, a switch and an operator therefor, said switch including a pair of contacts, means for establishing an electrical connection between said contacts, and resilient means biasing the connection establishing means to dis-establish such connection; and said operator comprising a cylinder, a piston in the cylinder, a flexible diaphragm defining a part of the cylinder, a valve body in communication with fluid in the portion of the cylinder between the piston and diaphragm and having a passageway therethrough from said portion to a portion of the cylinder outside thereof, and a pressure responsive valve adjacent said passageway and adapted to close said passageway upon a sudden increase in pressure of the fluid in the first-mentioned portion of said cylinder created by an abnormally quick movement of the piston toward said diaphragm, the closing of the passageway upon further movement of the piston resulting in a further increase in pressure in the first-mentioned portion and in a deflection of the diaphragm, and means for transmitting the deflection of the diaphragm to the connection-establishing means of the switch to establish such connection between said switch contacts, said valve body being disposed in said piston and including a tubular portion extending through said piston, said valve body having cross bores connecting the interior thereof with the exterior, a piston rod extending into the cylinder and into the tubular part of the valve body, said piston rod having a peripheral groove and said valve body being deformed into said groove to form a mechanical lock therebetween, and said piston further including a cup packing disposed around the valve body, said cross bores being disposed on the side of the piston opposite that on which the diaphragm is disposed.

6. In combination, a switch and an operator therefor, said switch including a pair of contacts, means for establishing an electrical connection between said contacts, and resilient means biasing the connection establishing means to dis-establish such connection; and said operator comprising a cylinder, a piston in the cylinder, a flexible diaphragm defining a part of the cylinder, a valve body in communication with fluid in the portion of the cylinder between the piston and diaphragm and having a passageway therethrough from said portion to a portion of the cylinder outside thereof, and a pressure responsive valve adjacent said passageway and adapted to close said passageway upon a sudden increase in pressure of the fluid in the first-mentioned portion of said cylinder created by an abnormally quick movement of the piston toward said diaphragm, the closing of the passageway upon further movement of the piston resulting in a further increase in pressure in the first-mentioned portion and in a deflection of the diaphragm, and means for transmitting the deflection of the diaphragm to the connection-establishing means of the switch to establish such connection between said switch contacts, said cylinder comprising a tube flared outwardly at one end and reduced in diameter at its other end, said switch including a block having a circular recess into which the flared end of the tube is received, and means for clamping the tube to the block around said flared end.

7. In combination a switch and an operator therefor, said switch comprising a plate having a pair of contacts thereon, a block having a recess in one side thereof, said plate being adapted to cover the recess to form a chamber, pivoted means in the chamber for establishing a connection between said contacts, resilient means normally holding the pivoted means in contact dis-establishing condition, said block having a recess on the side thereof opposite the side having the first-mentioned recess, a diaphragm covering the second recess, means between the diaphragm covering the second recess, means between the diaphragm and pivoted means for transmitting motion from the diaphragm to the pivoted means, a cylinder adjacent the block and defined in part by the diaphragm, a piston, and means between the piston and diaphragm for establishing a diaphragm-moving pressure in the cylinder upon an abnormally fast movement of the piston toward said diaphragm, said cylinder having a radially extending flange in contact with the block, and means for securing the cylinder, block and plate together, said means comprising a second plate having an opening adapted to receive the cylinder with the edge regions of the opening overlying the flange on said cylinder, and tabs on the second plate extending over the block and first-mentioned plate and then inwardly around said first-mentioned plate.

8. In combination, a switch and an operator therefor, said switch comprising a plate having a pair of contacts thereon, a block having a recess in one side thereof, said plate being adapted to cover the recess to form a chamber, pivoted means in the chamber for establishing a connection between said contacts, resilient means normally holding the pivoted means in contact dis-establishing condition, said block having a recess on the side thereof opposite the side having the first-mentioned recess, a diaphragm covering the second recess, means between the diaphragm and pivoted means for transmitting motion from the diaphragm to the pivoted means, a cylinder adjacent the block and defined in part by the diaphragm, a piston, and means between the piston and diaphragm for establishing a diaphragm-moving pressure in the cylinder upon an abnormally fast movement of the piston toward said diaphragm, said cylinder having a radially extending flange and said diaphrgam being interposed between the flange and block, and means for securing the cylinder, block and plate together, said means comprising a second plate having an opening to receive the cylinder, the edge regions of the opening overlying the flange, and tabs extending around the block and plate and then inwardly of the edges of the plate.

9. In combination, a switch and an operator therefor, said switch comprising a plate having a pair of contacts thereon, a block having a recess in one side thereof, said plate being adapted to cover the recess to form a chamber, pivoted means in the chamber for establishing a connection between said contacts, resilient means normally holding the pivoted means in contact dis-establishing conditions, said block having a recess on the side thereof opposite the side having the first-mentioned recess, a diaphragm covering the second recess, means between the diaphragm and pivoted means for transmitting motion from the diaphragm to the pivoted means, a cylinder adjacent the block and defined in part by the diaphragm, a piston, and means between the piston and diaphragm for establishing a diaphragm-moving pressure in the cylinder upon an abnormally fast movement of the piston toward said diaphragm, said pivoted means comprising a plate having a tab struck outwardly from the central region thereof and said first-mentioned plate having a recess to receive the tip of said tab whereby to cause the plate to fulcrum about the tip in the recess, and said second-mentioned plate having a tab struck outwardly from an edge region thereof, said block having a recess, a coil type spring in said recess, said second-mentioned tab extending into the spring and locating said spring with respect to the second-mentioned plate.

10. In combination, a switch and an operator therefor, said switch comprising a plate having a pair of contacts thereon, a block having a recess in one side thereof, said plate being adapted to cover the recess to form a chamber, pivoted means in the chamber for establishing a connection between said contacts, resilient means normally holding the pivoted means in contact dis-establishing condition, said block having a recess on the side thereof opposite the side having the first-mentioned recess, a diaphragm covering the second recess, means between the diaphragm and pivoted means for transmitting motion from the diaphragm to the pivoted means, a cylinder adjacent the block and defined in part by the diaphragm, a piston, and means between the piston and diaphragm for establishing a diaphragm-moving pressure in the cylinder upon an abnormally fast movement of the piston toward said diaphragm, said block having an opening therethrough communicating with the first and second recesses, and said means between the diaphragm and pivoted means for transmitting motion from the diaphragm to the pivoted means comprising a ball in the opening and having a diameter greater than the thickness of the block between said recesses, said ball being adapted to be moved by the diaphragm into contact with, and to move the pivoted means in the chamber.

References Cited in the file of this patent

UNITED STATES PATENTS

| | | |
|---|---|---|
| 2,445,756 | Bean | July 27, 1948 |
| 2,466,111 | Katcher et al. | Apr. 5, 1949 |
| 2,540,420 | Bordelon | Feb. 6, 1951 |